Figure 1:
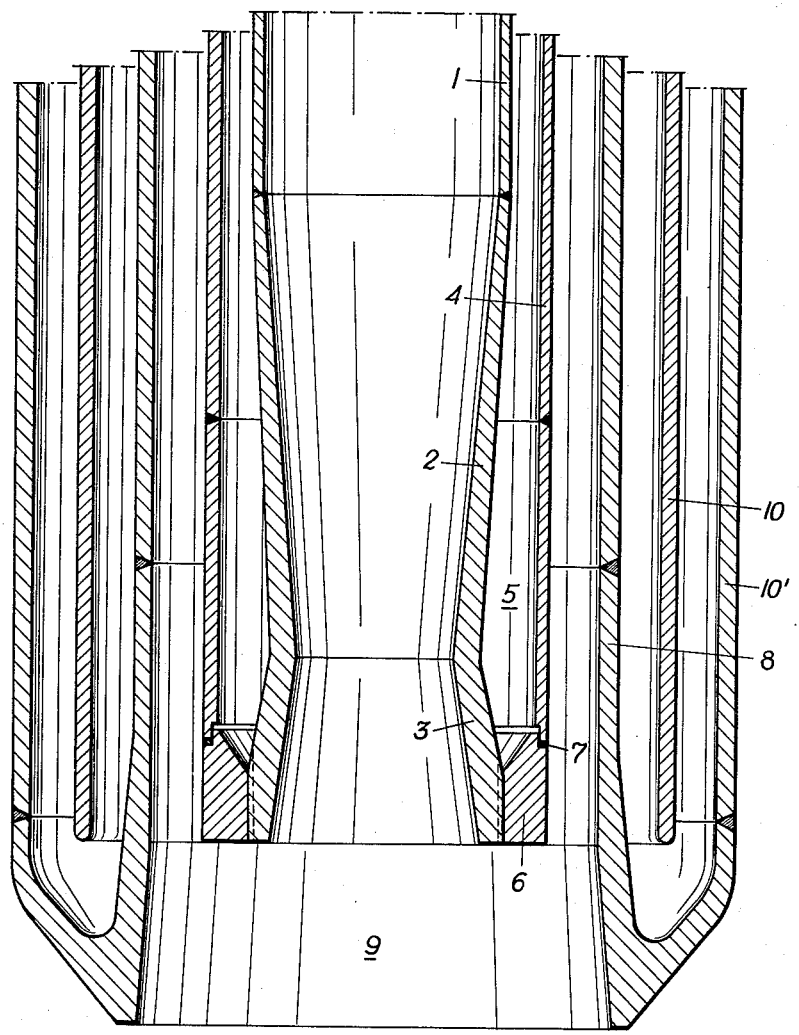

INVENTORS:
JOSEF EIBL
ERICH TREFIL
WALTER JILEK
SIEGFRIED ACHATZ
BY
THEIR ATTORNEYS

Nov. 9, 1965   J. EIBL ETAL   3,216,714
HEATING AND BLOWING DEVICE FOR METALLURGICAL PURPOSES
Filed Feb. 4, 1963   2 Sheets-Sheet 2

INVENTORS:
JOSEPH EIBL
ERICH TREFIL
WALTER JILEK
SIEGFRIED ACHATZ
BY
*Brumbaugh-Free. Graves & Donohue*
THEIR ATTORNEYS

United States Patent Office 3,216,714
Patented Nov. 9, 1965

3,216,714
HEATING AND BLOWING DEVICE FOR METALLURGICAL PURPOSES
Josef Eibl, Erich Trefil, Walter Jilek, and Siegfried Achatz, Linz (Danube), Austria, assignors to Bot Brassert Oxygen Technik AG., Zurich, Switzerland, a company of Switzerland
Filed Feb. 4, 1963, Ser. No. 257,810
4 Claims. (Cl. 266—34)

This invention relates to a heating and blowing device for metallurgical purposes. Preferred fields of application of the device according to the invention are the heating up of the charging materials placed in a refining crucible, the melting of solid materials, such as scrap, crude iron and ore, the refining in top-blowing processes with a controlled heat supply, the keeping hot of molten metals and alloys, as well as the pre-heating of ladles and casting molds.

It has already been proposed to use burners for supplying additional heat to charging materials used in refining processes, which do not possess a sufficient content of chemical heat-carriers (Si, P, Mn), in order to attain the refining temperature or to increase the scrap rating. Known devices for this purpose comprise oxygen blast tubes having a central fuel supply tube through which oil is fed under pressure. These devices have the disadvantage that the mixing effect between the oxygen and the fuel oil is insufficient and that, when the oxygen supply is increased, the flame has a strong refining effect without having obtained a sufficient heating effect. Attempts to let the fuel oil issue through bores or annular slots in the shell of the fuel supply tube in order to improve the mixing degree between the oxygen and the oil failed to yield satisfactory results; below the central fuel supply tube a vacuum was formed which constricted the oil and oxygen jet and sometimes removed it from the nozzle. As a result, the atomization intended by the bores and the annular slots is largely canceled.

The object of the invention is to avoid these disadvantages and difficulties; it is a special object of the invention to provide a heating and blowing device which is easily handled, ensures a thorough mixing of the fuel with the oxygen, allows for controllability and adjustability of the performance, i.e. of the heating effect on the one hand and of the refining effect on the other hand, and is suitable for various metallurgical applications, as indicated above.

It has been found that these objects can be obtained, if the fuel, such as oil or natural gas, it supplied through a tube having an annular cross section and if the annular jet, when discharging from the mouth of the tube, is in contact with the oxygen at the inside and at the outside. The heating and blowing device according to the invention is thus characterized in that it consists of a central oxygen blowing tube, a fuel supply tube concentrically surrounding the oxygen blowing tube, and an oxygen tube concentrically surrounding the fuel supply tube.

The inner tube and the fuel supply tube terminate with advantage a distance before the mouth of the outer tube. In this way a mixing room is formed below the mouth of the inner tube so that an excellent mixing of the oxygen and the oil is accomplished.

Suitably all of these tubes are provided with control valves, which permit of an independent control. Thus any desired type of flame can easily be accomplished. After heating of a charge in a refining crucible, the fuel supply and the outer oxygen flow can be shut off or throttled, whereupon the device may be used as a blowing device for the refining. During the course of the refining operation there may be a further heat supply, which can be adjusted with respect to the heat balance of the individual refining processes and exactly controlled, by a continued but adequately reduced supply of fuel and introduction of the required amount of oxygen through the outer oxygen tube. The flow rate control may be effected by provision of a valve in the outer oxygen tube and a manometer in the inner oxygen tube, in such manner that at first the flow of oxygen through the inner tube at different pressures (manometer readings at the inner tube) is determined and recorded, during which the outer oxygen tube is kept shut. The amount can be gathered from the oxygen indicator already present. After this gauging, the oxygen flow rate in the outer tube may be computed from the difference between the oxygen reading at the ring balance (adjustable by a control valve) and the calculated oxygen amount fed through the inner tube, and altered at random by a corresponding adjustment of the valve in the outer oxygen tube.

The inner tube may preferably have a convergent-divergent portion and may be designed as a de Laval nozzle at its mouth.

According to a preferred embodiment of the invention a replaceable annular insert may be provided between the inner oxygen tube and the fuel supply tube for the discharge of the fuel, which insert fits into the jacket space and has slots or bores. The annular insert may possess bores spaced around its periphery and opening into the jacket space between the fuel supply tube and the outer tube and/or into the mixing room below the inner tube. Suitably the bores may be oblique bores, the inclination of which relative to the axis varies and may be, e.g., alternately about 10° and about 30°.

If a gaseous fuel, such as natural gas, is to be employed instead of the liquid fuel, the annular insert may have segment-like slots spaced around the periphery.

The invention is explained more in detail in the accompanying drawing by way of illustrative embodiments.

Figure 2:
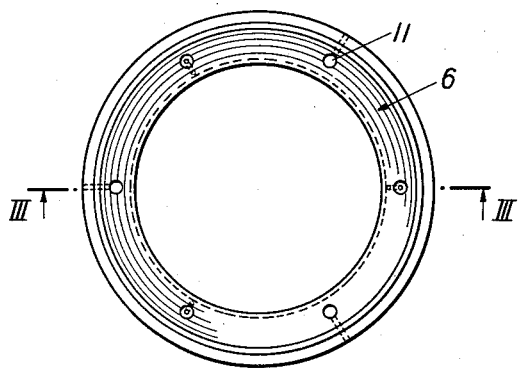
Figure 3:
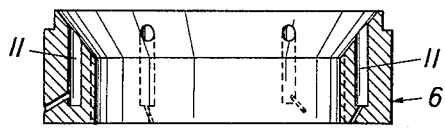
Figure 4:
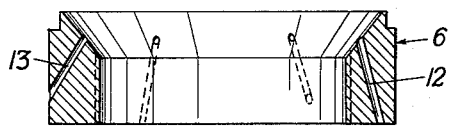
Figure 5:
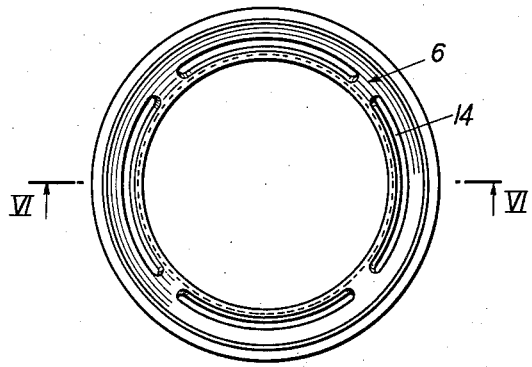
Figure 6:
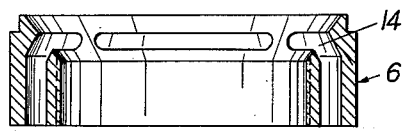

FIG. 1 is a longitudinal sectional view of a heating and blowing device according to the invention. FIG. 2 is a plan of an insert ring destined for the supply of liquid fuel. FIG. 3 is a vertical sectional view of the member shown in FIG. 2, and FIG. 4 is a modified embodiment thereof. FIG. 5 is a plan of the insert member destined for the supply of gaseous fuel, and FIG. 6 is a corresponding vertical sectional view.

Numeral 1 designates the inner oxygen tube of the device, which has a convergent portion 2 and a divergent portion 3 so that the mouth portion of this inner tube forms a de Laval nozzle. The oxygen-conducting inner tube 1 is co-axially surrounded by a fuel supply tube 4 so that an annular space 5 is formed through which the fuel may be fed. This annular space 5 is confined by an annular insert member 6. The annular insert connects the mouth portion of the inner oxygen tube 1 with the fuel supply tube 4 and is sealed against the latter by means of an annular seal 7 consisting preferably of copper. The fuel supply tube 4 is concentrically surrounded by the tube 8 which conducts oxygen. This outer tube 8 projects beyond the mouth of the inner tube and the insert 6, which ends on the same level as the inner tube, so that a mixing room 9 is formed below the inner tube, in which oxygen can be thoroughly mixed with the fuel supplied. The tube 8 is surrounded by a double cooling jacket 10, 10′ in which a coolant circulation is maintained in known manner.

The heating and blowing device is particularly intended for use in top-blowing refining processes, the device being inserted into the crucible from above and moved by lifting and lowering means.

In FIGS. 2 to 6 several embodiments of the insert ring for the supply of fuel are illustrated.

FIG. 2 is a plan of the annular insert. Spaced around the periphery of the ring are bores 11 which, as is shown in FIG. 3, may be arranged with varying inclinations relative to the axis and may open either into the annular space between the insert 6 and the oxygen-conducting outer tube 8 or into the mixing room 9.

In FIG. 4 a preferred embodiment is illustrated. One series of bores, which are indicated by 12 here, include an angle of about 10° with the axis, and another series, designated by 13, include an angle of about 30° with the axis. It is of particular advantage if the bores having different inclinations relative to the axis are provided in alternating succession, as this affords the best mixing effect.

The insert illustrated in FIGS. 2, 3 and 4 is particularly intended for the supply of fuel oil, i.e. of liquid fuel.

In FIGS. 5 and 6 an annular insert for the supply of gaseous fuel is illustrated, again as a plan and as a vertical sectional view. Instead of the bores, in this embodiment a number of segment-like slots 14 are spaced around the periphery of the insert, which open directly into the mixing room 9.

What we claim is:

1. A heating and blowing device for top-blowing refining of steel, comprising a central oxygen blowing tube having a convergent-divergent end portion forming a de Laval nozzle, a fuel supply tube concentrically surrounding and spaced radially from the central oxygen tube to form an annular space between said central tube and said fuel supply tube, an outer oxygen tube concentrically surrounding and radially spaced from the fuel supply tube, said central tube and said fuel supply tube having outer ends disposed inwardly of the outer end of the outer tube to provide a mixing chamber within said outer tube, a replaceable annular insert spanning said annular space between the outer ends of said central and fuel supply tubes and having openings for discharging fuel into said chamber in a plurality of streams converging toward the axis of said chamber in the direction of the outer end of said outer tube.

2. A heating and blowing device as set forth in claim 1 comprising openings in said insert for directing fuel outwardly into the annular space between the fuel supply tube and the outer oxygen tube.

3. A heating and blowing device as set forth in claim 2, wherein said openings comprise oblique bores spaced around the periphery of said insert, the inclination of said bores relative to the axis of said chamber being alternately about 10° and about 30°.

4. A heating and blowing device as set forth in claim 1, wherein said insert is provided with segment-like slots spaced around its periphery for supplying gaseous fuel.

References Cited by the Examiner

UNITED STATES PATENTS

| 2,286,191 | 6/42 | Aitchison et al. | 158—27.4 X |
| 2,407,972 | 9/46 | Aitchison | 158—27.4 |
| 2,732,257 | 1/56 | Cress | 239—132 X |
| 3,130,252 | 4/64 | Metz | 266—35 |

WHITMORE A. WILTZ, *Primary Examiner.*

WILLIAM B. KNIGHT, MORRIS O. WOLK, *Examiners.*